Jan. 6, 1948.  C. L. BOSSMEYER  2,433,885
SPRINGLESS GOVERNOR
Filed Sept. 21, 1945
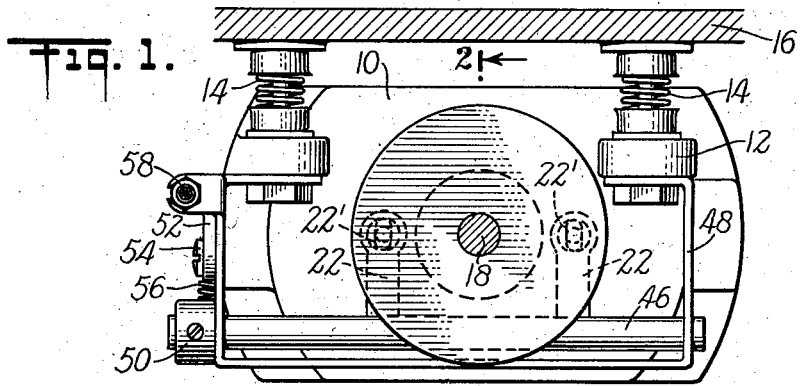
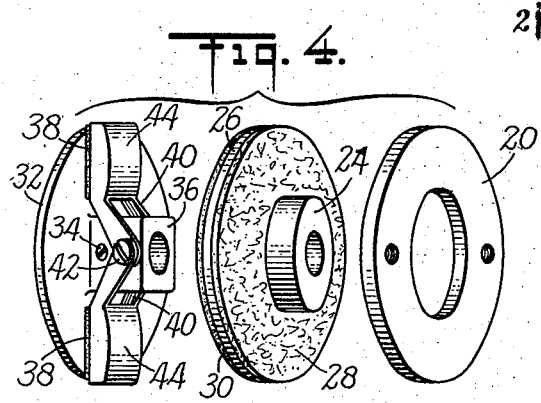
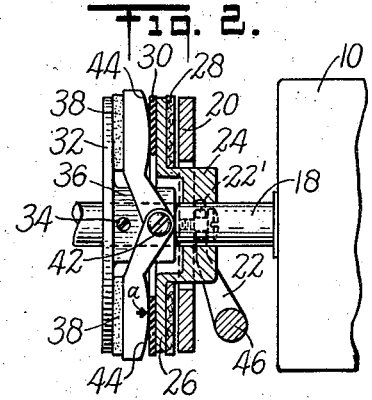
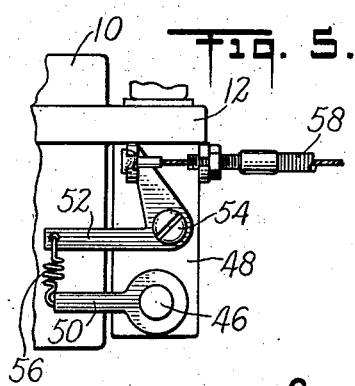
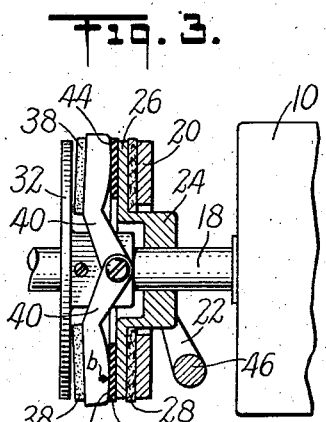
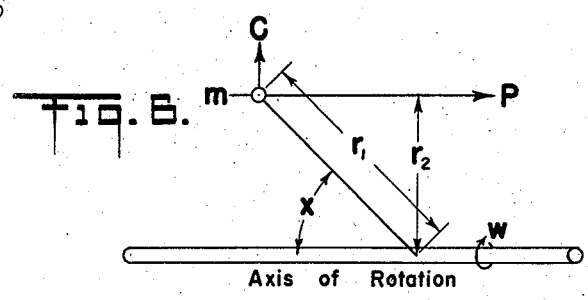
INVENTOR
*Charles L. Bossmeyer*
BY
*Blair, Curtis & Hayward*
ATTORNEYS Patented Jan. 6, 1948

2,433,885

UNITED STATES PATENT OFFICE 2,433,885

SPRINGLESS GOVERNOR

Charles L. Bossmeyer, Stratford, Conn., assignor to Dictaphone Corporation, New York, N. Y., a corporation of New York Application September 21, 1945, Serial No. 617,787

4 Claims. (Cl. 188—187)

This invention relates to centrifugal governors and more particularly to governors suitable for controlling the speed of phonograph motors and the like, wherein a controlled braking action is employed to regulate the speed.

In the case of recording phonographic machines, maintenance of constant speed is necessary to prevent distortion and change of pitch in the recorded sound. These reasons for holding the speed constant are also applicable to reproducing machines; but in addition it is necessary to vary the speed over a predetermined range and maintain the selected speed constant.

An object of the present invention is to provide an improved centrifugal governor of a kind adapted for mounting in a very narrow space as measured along the axis of the rotating part, such as a phonograph motor shaft. The standard type of phonograph governor consists of a sliding sleeve on the motor shaft attached to a fixed sleeve on said shaft by means of leaf springs. Weights are secured to the centers of these springs and are caused to fly out from the shaft by centrifugal force when the motor runs, but are restrained by the tension of the springs from too rapid action. A disc, attached to the sliding sleeve, is brought into contact with brake shoes as the weights fly outward and thus limits the speed of the motor by frictional contact. This type of governor permits of effective adjustment to maintain constant speed only over a relatively narrow range of speeds, springs are easily broken, and it is practically impossible therewith to obtain dynamic balance at a plurality of different speeds because of the uneven flexure of the springs.

Another object of the present invention is to provide a governor smoothly adjustable for maintaining constant speeds over a relatively wider range and which will have dynamic balance at all speeds. Another object is to provide a phonograph governor having few parts, all easy to manufacture and whose construction is simple and rugged.

Other objects will be in part obvious and in part pointed out hereinafter.

The invention, accordingly, consists in the features of construction, combination of elements, and arrangements of parts which will be exemplified in the structure to be hereinafter described and the scope of the application of which will be indicated in the following claims.

In the accompanying drawings, in which is shown one of the various possible embodiments of the invention;

Fig. 1 is an end side elevation of a speed control mechanism made in accordance with the present invention, showing the motor shaft and a portion of the phonograph base plate in cross-section and the motor supported by the base plate;

Fig. 2 is in part a side elevation of the mechanism and in part a cross-section taken on line 2—2 of Fig. 1, showing the parts in non-operative or idle position;

Fig. 3 is a view similar to Fig. 2 showing the parts in operative position as when the governed shaft is rotating;

Fig. 4 is an exploded perspective view of the three main elements of the control mechanism;

Fig. 5 is a side elevation of a part of the motor frame showing means for adjusting the governor parts to vary the operation to maintain constant speed at different desired speed levels; and Fig. 6 is a diagrammatic view showing schematically the distribution of the forces in a governor having swinging weights with the pivot in the axis of the rotating shaft.

Referring to the governor generally in its broader aspects, it may be said to consist of a guard plate and weight mount, a friction disc, a brake ring, a control ring, and suitable weights pivotally mounted on the guard plate in the axis of the motor or other shaft, which are actuated centrifugally to press the friction disc against the control ring with braking action proportional to centrifugal force, which is proportional to the rotative speed of the shaft.

As shown in the accompanying drawings, the motor 10 is mounted upon and forms part of a motor frame 12 which is preferably suspended by spring mountings 14 from the base plate 16 of the phonograph.

For controlling the speed of the motor, the motor shaft 18 is provided with a speed-regulating governor which, in the embodiment of the invention herein disclosed, comprises a control ring 20 loosely surrounding the shaft 18 but held against rotation in predeterminedly set positions along the shaft by manually set adjusting arms 22, described in fuller detail hereinafter. The setting of this arm determines the governed speed of the motor. To save space the control ring is disposed as close to the motor as may be convenient. This ring is loosely mounted upon the hub 24 of a friction disc 26 loosely and slidably mounted upon shaft 18 adjacent the control ring 20. This disc carries between one of its faces and the control ring, a leather ring 28 which provides braking action when pressed against the control ring. The other face of the friction disc is provided with a facing, preferably of rubberized cork 30, having a high coefficient of friction.

A guard plate and weight mount 32 adjustable as to position upon the shaft 18 but normally fixed non-rotatively in relation to the shaft by means of a set screw 34 has an axially extending sleeve or hub 36 which, when the governor parts are assembled in operative condition, is loosely received within the hub 24 of the friction disc 26. A pair of weights 38 are pivotally mounted upon the hub 36 to swing about an axis cutting the axis of the hub-bore for the shaft 18 at right angles. The weights are positioned diametrically opposite one another and each is carried by a pair of dog-leg shaped arms 40, an arm of each pair being mounted at opposite sides of the hub upon a pivot screw 42. The centers of gravity of the weights lie in a line positioned between the face of the guard plate and the pivot point of the weight, wherefor normally the weights, when uninfluenced by centrifugal action, are supported by the said face of the guard plate. The faces 44 of the weights constitute curved cams adapted to have a rolling motion over the surface of the cork ring 30 on the friction disc when moved outwardly from the shaft 18 by centrifugal action. In the present embodiment of the invention these faces are circular arcs. The radius of this arc may be selected to meet various conditions of operation, or they may have other than circular contour.

As is well known, weight operated governors exert a force which increases with the square of the motor speed while the speed-torque characteristics of motors of the series type, such as are generally used in phonographs, require a small force at high speed and a large braking force at low speed. This reversal of the force-speed gradient of the weights is obtained herein by a change of the direction of the acting forces, to the effect that at highest speeds and centrifugal forces the least horizontal component obtains, and vice versa. Also, to achieve better control, in the present case, a novel additional means for varying the brake forces is introduced. This means comprises the cam faces of the weights which serve to modify the normal effect of the braking forces of the weights as they respond to changes of speed of the shaft. Thus at any selected speed or speeds the braking forces applied may be amplified or reduced by designing the cams in accordance with the modification desired.

By referring to Fig. 6 of the drawings, the action of the governor may be made clearer. This figure shows schematically the distribution of the forces in a governor having swinging weights with the pivot in the axis of the rotating shaft. Only one weight is shown although at least two are needed for balancing.

The weight of mass ($m$) is forced to rotate with the rotational speed ($w$) of the shaft. It will be subjected to a centrifugal force (C) which is proportional to the mass, the square of the angular velocity ($w$), and to the distance of the mass from the axis of rotation or:

$$C = m \cdot w^2 \cdot r_1 \sin x$$

This centrifugal force tends to rotate the weight around its pivot with a torque ($M_m$) which is proportional to the centrifugal force and to the axial distance of the weight from the pivot or:

$$M_m = (m \cdot w^2 \cdot r_1 \sin x) \times (r_1 \cos x) = \frac{m}{2} w^2 r_1^2 \sin 2x$$

The brake force (P) exerted by the weight in axial direction is then for any angle:

$$P = \frac{m}{2} \cdot w^2 \cdot \frac{r_1^2}{r_2} \sin 2x$$

where $r_2$ is the radial distance of the point of attack of the force from the axis of rotation. It can be seen that the greatest braking force can be obtained for angle $x = 45°$ and that the braking force is sinusoidally reduced with increasing angle until it becomes zero at $x = 90°$. Such a governor would require a relatively wide swing of the weights for even a small speed variation and the regulation would be poor at the higher speeds within the range. This disadvantage is avoided and smooth control throughout the desired range is obtained by the use of cam faced weights, as set forth herein. These permit sufficient reduction of the maximum swing of the weights to give good control in all cases where, as in the case of phonograph motors generally, wide speed variation is not required.

Referring to the present disclosure, the action of the governor parts is as follows:

When the motor is not running, the weights 38 hang loosely on their mounting studs 42 and are kept from falling outward by the guard plate 32, as shown in Fig. 2.

When the motor is started, see Fig. 3, the weights swing outwardly and tend to assume a position with their centers of gravity lying in a plane passing through their pivots at right angles to the motor shaft, and with their cam faces in frictional contact with the rubberized cork friction facing of the friction disc 26. This movement causes the friction disc to revolve with the weights and move axially toward the stationary control ring 20. Thus a point is reached at which the leather brake ring 28 begins to press against said control ring.

The slope of the weights, i. e. the angle $x$ in Fig. 6, and the way in which they are mounted is such that the least applied braking effect occurs at highest speed. At low speeds, contact between the weights and the friction disc is relatively near the center, as at $a$, Fig. 2. As the speed increases, the point of contact moves outward, as to a point $b$, Fig. 3, tending to increase the braking load. However, the component of force pressing the weight against the friction disc becomes less and less as the slope of the weight approaches the perpendicular. The contact between the weights and the friction disc will then have moved outwardly to a point at which there is no horizontal component and consequently no braking action between the weights, the friction disc and the control ring. This point will be placed well outside the working range of the governor.

The high frictional coefficient of the rubberized cork facing on the friction disc causes the weights to maintain contact with the disc, which in turn revolves continuously with the weights, except for momentary slippage where motor speed decreases. This momentary reduction in pressure reduces the pressure between the leather brake ring 28 and the control ring 20 and allows the motor to pick up speed to the point where the weights again increase pressure between brake ring and control ring and motor acceleration is controlled. The rapid changes of pressure on the leather brake ring quickly compensate for very slight changes in motor speed due to fluctuation in load or voltage.

It will thus be seen that slippage between friction disc facing and weight faces, is slight, so that the friction disc revolves at only slightly less than motor speed. Consequently there is practically no appreciable wear on either of these parts. It will also be seen that as the control ring fits loosely upon the hub of the friction disc without pressure, wear at this point will also be negligible.

The only pressure between moving parts is pressure of the friction disc 26 against the leather brake ring 28 which in turn is pressed against the stationary control ring 20. The leather ring floats between the two metal members, and with large areas in contact, wear is reduced to a minimum.

The relative slippage between the leather disc, the friction disc with its rubberized facing and the weights, is determined by the relative coefficients of friction of the two friction materials and their areas of contact.

Manual adjusting means for selectively determining the speed at which the motor may operate has been referred to above. This includes the control ring 20 and mechanism for setting the control ring variably in relation to the axial movement of the friction disc to oppose the traveling movement of the friction disc. The opposing means thus constitutes a brake mechanism which comprises the above mentioned arms 22, which are carried by or are made integral with a cross shaft 46 which is rotatably mounted, at its ends, in a hanger 48 depending from a portion of the motor frame 12. The arms 22 extend upwardly from the shaft 46 to straddle the motor shaft 18, see Fig. 1. The upper ends of the arms are secured to the back of the control ring at opposite sides of the shaft 10 in any suitable manner, as for instance by the slot and bolt arrangement indicated at 22¹. Thus a rocking movement of the shaft 46 will move the control ring toward or away from the friction disc 26. Any suitable means may be provided to hold the shaft 46 in any adjusted position, and thus predetermine the operating speed at which the governor holds the motor shaft in control.

As shown herein the means employed comprises a lever arm 50 fixed to the shaft 46 and a bell crank lever 52 rotatable about a pivot screw 54, threaded into the side of the hanger 48. One arm of lever 52 is connected by tension spring 56 to lever arm 50. The other arm of lever 52 may be manually operated in any suitable manner. In the drawings operation by Bowden wire 58 is indicated. Relative movement of the elements of the Bowden wire will cause a rocking movement of bell crank lever 52. This motion will be resiliently imparted to lever arm 50, shaft 46, arm 22 and control ring 20. Since relative movement of the Bowden wire elements may be stopped at any desired point, it follows that accurate adjustment of the braking member or control ring 20 may be made at will by the operator of the phonograph. For a more complete description of such an adjustment of a brake governor by means of a Bowden wire, reference may be had to U. S. Patent 2,286,187, issued to J. M. Lucarelle et al., for speed control mechanism.

From the foregoing it will be seen that the present type of governor without springs and with cam faced weights as described herein, the following advantages accrue as compared with the standard type of governor having the weights supported by leaf springs.

1. *Size.*—Diameter smaller than the ball circle of present governor at high speed.

2. *Balance.*—Weights can be made to balance each other and remain in dynamic balance at all speeds. Present governors change dynamic balance with speed changes due to the impracticability of obtaining springs with exactly the same characteristics when flexed.

3. *Simplicity.*—Few parts. All parts easy to manufacture. Present governor, 27 parts, new governor, 12 parts.

4. *Safety.*—No springs to break or come loose. Present governor springs bend and break and holding screws loosen.

5. *Speed range.*—Much wider governed speed range possible and very much wider total speed range.

6. *Speed constancy.*—More constant speed over the usual desired range.

7. *Free starting at any speed.*—Because there is no governor load at the start. Present governor brake shoes may bear on friction disc without governor ball action at low speed. It does not go into action at as low speeds because spring tension tends to overcome centrifugal force.

8. *Ease of adjustment.*—Simply set guard plate at marked position on motor shaft and tighten set screws. Present governor must be set by trial and error to get proper operation and speed range.

I claim:

1. In a governor mechanism, in combination with a driven shaft, centrifugal means operable by rotation of the shaft to effect a thrust axially thereof comprising a body member mounted in fixed position upon said shaft to rotate therewith and a plurality of weights disposed about said shaft in balanced relation and pivotally mounted upon said body to swing by centrifugal action about axes respectively normal to said shaft axis and mutually coinciding at a point in said shaft axis, a plate independently mounted without connection with said weights rotatable about said shaft and movable axially along said shaft, a friction facing upon one side of said plate adapted to coact with contact surfaces upon said weights when the latter are acted upon centrifugally by rotation of said shaft to effect simultaneously rotation and axial movement of said plate, a fixed brake member adjustable axially toward and away from said plate, and friction braking means interposed between said brake member and said plate to retard rotation of said plate according to the axial thrust effort imparted to said plate by said centrifugal means.

2. A governor mechanism according to claim 1, in which the contact surfaces of said weights are cams cooperative with said plate facing to modify the centrifugal force effect of said weights upon said plate.

3. In a governor mechanism, in combination with a driven shaft, centrifugal means operable by rotation of the shaft to effect a thrust axially thereof comprising a body member mounted in fixed position upon said shaft to rotate therewith and pivotally supporting a plurality of weights to swing by centrifugal force about axes respectively normal to said shaft at the same point in said shaft axis, a friction plate rotatable about said shaft and movable axially along said shaft having friction means adapted to coact with contact surfaces upon said weights to effect rotation and axial movement of said friction plate, and a brake control member adjustable axially relative to said friction plate to retard rotation of said plate in accordance with the axial thrust imparted to said plate by said weights.

4. A governor mechanism as claimed in claim 3, in which the contact surfaces of said weights are cams cooperative with said plate to modify the braking force applied to said plate at any operative position of said weights.

CHARLES L. BOSSMEYER.

REFERENCES CITED

The following references are of record in the file of this patent:

UNITED STATES PATENTS

| Number | Name | Date |
|---|---|---|
| 788,373 | Pfeiffer | Apr. 25, 1905 |
| 1,334,499 | Kenerson | Mar. 23, 1920 |
| 2,323,791 | Carrington | July 6, 1943 |